(12) United States Patent
Sulzbach et al.

(10) Patent No.: US 7,230,037 B2
(45) Date of Patent: Jun. 12, 2007

(54) METHOD FOR MIXING A POLYOL COMPONENT AND AN ISOCYANATE COMPONENT

(75) Inventors: Hans-Michael Sulzbach, Königswinter (DE); Reiner Raffel, Siegburg (DE); Jürgen Wirth, Köln (DE); Wolfgang Pawlik, Köln (DE); Florian Thiebes, Königswinter (DE); Lothar Röhrig, Neunkirchen-Seelscheid (DE)

(73) Assignee: Hennecke GmbH, Leverkusen (DE)

( * ) Notice: Subject to any disclaimer, the term of this patent is extended or adjusted under 35 U.S.C. 154(b) by 298 days.

(21) Appl. No.: 10/656,349

(22) Filed: Sep. 5, 2003

(65) Prior Publication Data

US 2004/0198870 A1 Oct. 7, 2004

(30) Foreign Application Priority Data

Sep. 11, 2002 (DE) .............................. 102 42 100

(51) Int. Cl.
*C08G 18/00* (2006.01)
*C08G 18/28* (2006.01)
*C08J 9/00* (2006.01)
*C08K 3/20* (2006.01)
*C08L 75/00* (2006.01)

(52) U.S. Cl. ..................... 521/170; 366/78; 366/79; 366/192; 366/194; 366/195; 366/196; 366/181.4; 366/181.5; 366/264; 366/266; 366/286; 366/292; 366/293; 366/322; 366/344; 366/324; 366/325.92; 422/129; 422/133; 422/135; 422/137; 422/193; 422/226; 422/229; 422/242; 521/117; 521/128; 521/155; 521/157; 521/172; 521/174; 521/82; 524/590

(58) Field of Classification Search ................. 524/590; 523/324; 521/117, 128, 155, 157, 170, 172, 521/174, 82, 99; 422/129, 133, 135, 137, 422/193, 226, 229, 242; 366/78, 79, 192, 366/76.6, 196, 181.4, 181.5, 195, 264, 282, 366/293, 286, 292, 266, 322, 344, 325.92, 366/324

See application file for complete search history.

(56) References Cited

U.S. PATENT DOCUMENTS

| | | | | |
|---|---|---|---|---|
| 3,051,455 A | | 9/1962 | Magester | 259/8 |
| 3,319,937 A | | 5/1967 | Wilson et al. | 259/8 |
| 3,346,529 A | * | 10/1967 | Peters | 523/318 |
| 3,807,703 A | * | 4/1974 | Day | 366/290 |
| 3,881,871 A | | 5/1975 | Porter | 23/252 R |
| 4,107,793 A | | 8/1978 | Wallace | 366/312 |
| 4,805,154 A | | 2/1989 | Schneider | 366/303 |
| 5,100,699 A | * | 3/1992 | Roeser | 427/256 |
| 5,296,517 A | | 3/1994 | Wetzig et al. | 521/155 |

* cited by examiner

*Primary Examiner*—Patrick Niland
(74) *Attorney, Agent, or Firm*—Joseph C. Gil; Lyndanne M. Whalen; John E. Mrozinski, Jr.

(57) ABSTRACT

The present invention relates to a method for the continuous mixing of at least one polyol component and at least one isocyanate component and optionally additives to form a polyurethane reaction mixture in a stirrer mixer with an axially conveying stirrer.

12 Claims, 1 Drawing Sheet

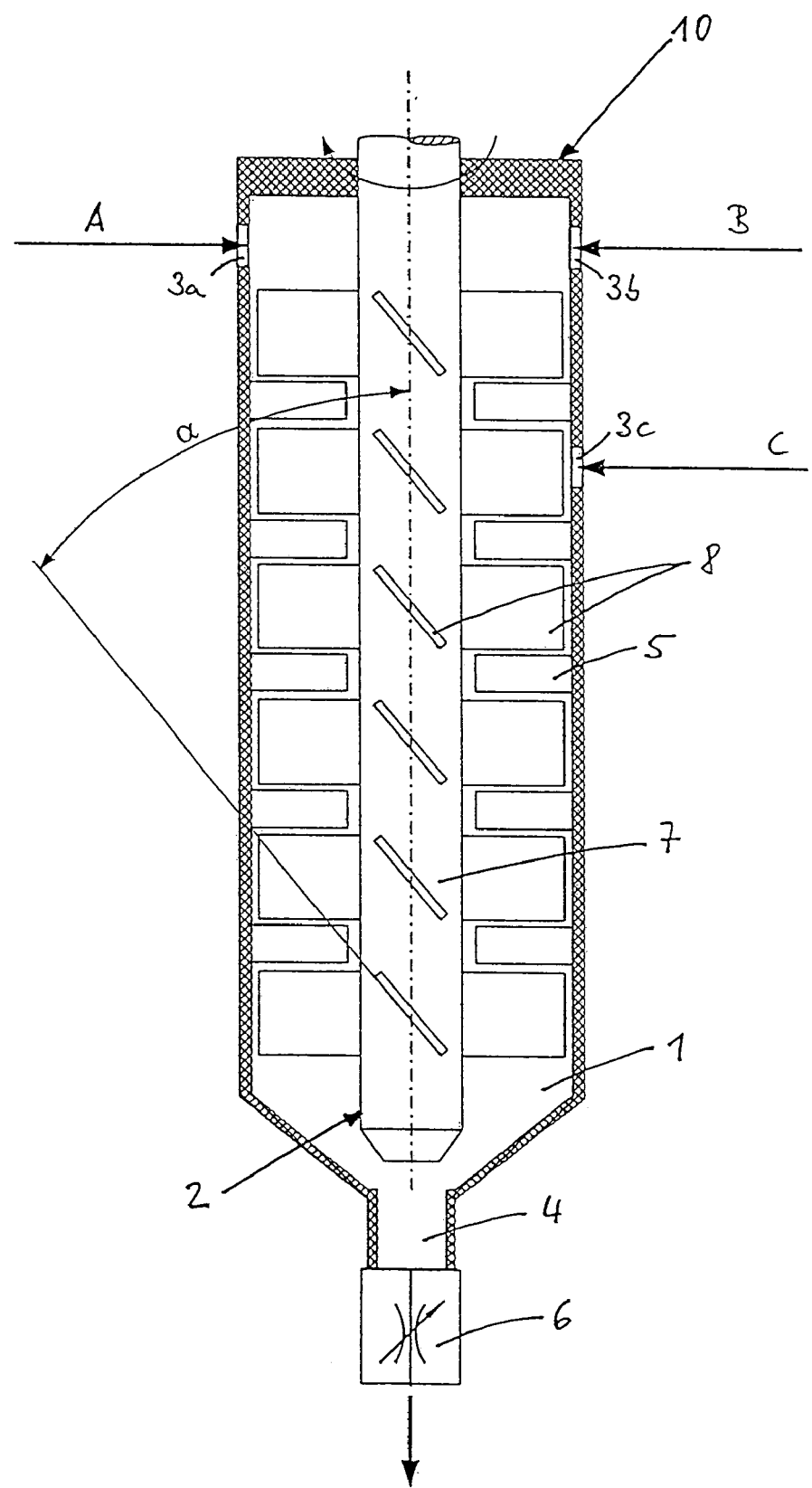

METHOD FOR MIXING A POLYOL COMPONENT AND AN ISOCYANATE COMPONENT

FIELD OF THE INVENTION

The present invention relates to a method for the continuous mixing of at least one polyol component and at least one isocyanate component and optionally additives to form a polyurethane reaction mixture in a stirrer mixer.

BACKGROUND OF THE INVENTION

Polyurethane foamed material is formed by the chemical reaction of polyol, isocyanate and optionally additives such as stabilizers, activators and colorants. So that the liquid components can react with one another, they must be homogeneously mixed with one another in a suitable way. Various principles are known for carrying out this basic process technology operation. One possible way of mixing the polyurethane raw materials is to use continuously operating stirrer mixers. These stirrer mixers generally have a rotationally symmetrical mixing chamber in which a stirring means (hereinafter also termed stirrer) is rotatably driven by a motor. Optionally, the mixing chamber may include stationary internal fittings that assist the stirring procedure, which are termed counter-pins. The mixing chamber often has a throttle a short way upstream of the outlet opening, by means of which the pressure in the mixing chamber can be regulated during the production procedure. In continuously operating stirrer mixers, the components to be mixed are added radially from outside. The addition to the mixing chamber is effected by screwed-in nozzles or through tubes. The polyurethane reaction mixture that is formed by the mixing of the polyurethane raw materials leaves the mixing chamber through a centrally arranged outlet opening. The components to be mixed are added to the mixer with the aid of pumps.

The stirrers hitherto used in the production of polyurethane foamed material, such as the commonly employed pin stirrer, only perform the task of homogeneously mixing the components to produce a polyurethane reaction mixture. In this connection, the flow that is generated by the pumps superimposes a further flow that is generated by the rotation of the stirrer. This stirrer flow generated by the stirrer homogeneously mixes all components with one another. This stirrer flow can form inter alia flow vortices that exert resistance to the flow generated by the pumps. With increasing stirrer speed, the flow resistance of the stirrer mixer thus rises, which is manifested in a higher pressure loss and thus in a higher mixing chamber pressure.

The pumps necessarily cause the reaction mixture to flow through the mixer. The mean residence time of the mixture in the mixer is determined by the throughput of components and the volume of the mixing chamber. The mean residence time is calculated from the quotient of the sum of the volume flows and the mixing chamber volume. The value of the mean residence time is normally in a range from 0.1 to 2.5 seconds. The mixer exerts a hydrodynamic resistance on the flow. Accordingly, a pressure loss is produced that directly determines the pressure in the mixing chamber, the so-called mixing chamber pressure. The mixing chamber pressure is typically measured in the feed line of the polymer stream.

Important process parameters that influence the subsequent quality of the polyurethane foamed material are the stirrer rotational speed, the mixing chamber pressure and the throughput of polyurethane reaction mixture. In the production of polyurethane foamed material, it is known that the mixing chamber pressure has a decisive influence on the number of cells of the finished foamed material (EP-A1-0 565 974). In general, fine-cell foamed material can be produced only at low mixing chamber pressures. At high mixing chamber pressures, coarse-cell foamed material is produced.

In the known stirrers the process parameters, stirrer rotational speed, throughput and mixing chamber pressure cannot be adjusted independently of one another. If the throughput is raised, the mixing chamber pressure also rises. Similarly, the mixing chamber pressure rises with an increase in the stirrer rotational speed.

Apart from this, with an increase in the throughput amount, the mean residence time in the mixing chamber drops. To be able to produce a homogeneously mixed polyurethane reaction mixture under a reduced residence time, a correspondingly higher stirrer rotational speed is necessary. On raising the throughput, the mixing chamber pressure thus rises not only on account of the greater flow resistance due to the increased discharge output, but also due to the necessary rise in the stirrer rotational speed. At high discharge outputs, it is therefore not possible with a given structural size of the stirrer mixer to adjust a low mixing chamber pressure, which is required for the production of fine-cell foamed material.

Stirrer devices are known in the art that effect an axial conveyance, such as inclined blade stirrers and propeller stirrers. These, however, operate in large vessels where the distance to the outer wall is relatively large. For the continuous mixing of polyurethane components with the aim of producing a homogeneous polyurethane reaction mixture, hitherto only stirrer devices that do not effect an axial conveyance have been used. The important feature of stirrer mixers for mixing polyurethane components is above all the short distance remaining between the mixer chamber wall and the rotating stirrer device. Usually, a gap that is not larger than 5 mm remains. Furthermore, the low residence time of normally between 0.1 and 2.5 seconds in the stirrer mixer in the production of polyurethane foamed material is a characteristic feature.

SUMMARY OF THE INVENTION

The present invention provides a method for mixing at least one polyol component and at least one isocyanate component in which the stirrer rotational speed and the mixing chamber pressure can be adjusted to any desired value independently of the discharge output, so that fine-cell polyurethane foams can be produced.

These and other advantages and benefits of the present invention will be apparent from the Detailed Description of the Invention herein below.

BRIEF DESCRIPTION OF THE FIGURE

The present invention will now be described for purposes of illustration and not limitation in conjunction with the FIGURE, wherein:

FIG. 1 depicts a preferred apparatus for practicing the inventive method.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides a method for the continuous mixing of at least one polyol component and at least one isocyanate component and optionally additives to form a polyurethane reaction mixture in a stirrer mixer comprising a cylindrical mixing chamber having a stirrer rotating therein with adjustable rotational speed, the stirrer containing a stirrer shaft and scoops or blades arranged thereon in one or more levels, the stirrer mixer having feed openings for at least the polyol component, the isocyanate component and optionally the additives and an outlet opening for the polyurethane reaction mixture, wherein three to six scoops or blades are arranged in each level on the stirrer shaft such that the scoops or blades are rotated by an angle α of 10° to 80° counter to the axis of rotation of the stirrer shaft, the method comprising, feeding the polyol component, the isocyanate component and optionally the additives in a metered manner through the feed openings into the cylindrical mixing chamber and mixing therein to form the polyurethane reaction mixture, discharging the polyurethane reaction mixture from the mixing chamber through the outlet opening and reducing the polyurethane reaction mixture pressure in an adjustable throttle, wherein the pressure in the mixing chamber is adjusted by a mutually matched setting of the rotational speed of the stirrer and of the throttling effect of the throttle.

Preferred as isocyanate component are the diisocyanates and/or polyisocyanates known in polyurethane chemistry, such as for example toluene diisocyanate (TDI) or isocyanates of the diphenylmethane series (MDI).

Preferred as polyol component are the polyols containing hydrogen atoms reactive to isocyanate groups known in polyurethane chemistry, such as polyethers, polyesters or polyamines.

As additives there may be used the auxiliary substances and additives known in polyurethane chemistry, such as for example blowing agents, catalysts, emulsifiers, stabilizers, reaction inhibitors, pigments, dyes, flameproofing agents or fillers.

Preferred as throttle or throttle device are, for example, pinch valves or membrane valves.

In the method according to the invention, the pressure in the mixing chamber can be adjusted as desired independently of the discharge output and the stirrer rotational speed, by the combination of the employed axially conveying stirrer together with the throttle. In this connection, the geometry of the employed stirrer has the effect such that an increase in the stirrer rotational speed without using a throttling device causes a drop in the mixing chamber pressure or the mixing chamber pressure remains at the same level. To achieve this, the stirrer is preferably an inclined blade stirrer having a driven shaft equipped with carrier blade-like scoops or blades arranged in one or more stages. One stage has three to six scoops or blades. These blades or scoops are rotated by an angle α counter to the axis of rotation. If the scoops or blades are instead of a flat plate having a carrying blade profile, then α corresponds to the angle between the chord of the profile and axis of rotation. The angle α denotes the inclination of the blades or scoops. With angles that are greater than 0° and less than 90°, the stirrer has an axially conveying character.

According to the invention the angle α is adjusted to from 10° to 80°, preferably 20° to 70°, and more preferably 30° to 60°. The conveying direction depends in this connection on the direction of rotation. This must be chosen so that the stirrer conveys axially in the direction of the mixture outlet. If the volume flow fed to the mixer were to flow freely from a reservoir, then the system would respond to an increase in the stirrer rotational speed by an increased discharge output. Because the volume flow flowing through the mixer is set only by the pumps, the system cannot react to an increase in the stirrer rotational speed by an increased discharge output. Accordingly, an axially conveying stirrer in this case causes the pressure in the mixing chamber to drop. By means of this axial pumping effect, the mixing chamber pressure can be reduced or maintained constant with increasing stirrer rotational speed.

By the combination of the just described stirrer with a throttle device, it is now possible to adjust any desired mixing chamber pressure. To mix the polyurethane raw materials sufficiently homogeneously with one another, a minimum rotational speed of the stirrer is necessary depending on the adjusted total discharge output of the stirrer mixer. If the throttle is completely open, so that the throttle device does not offer any resistance to the flow, then a defined mixing chamber pressure is adjusted. If this mixing chamber pressure is greater than the mixing chamber pressure desired for the production of the foamed material, then it can be reduced by raising the stirrer rotational speed to the desired value. If the mixing chamber pressure is, however, less than the desired mixing chamber pressure, then the mixing chamber pressure can be raised to the desired value by adjusting the throttle, whereby the throttle device exerts an hydrodynamic resistance to the flow of the polyurethane reaction mixture. According to the invention the exact adjustment of the pressure inside the mixing chamber can be effected as well by setting the throttle at a constant rotational speed of the stirrer as by setting the rotational speed of the stirrer at a constant throttle adjustment.

The exact adjustment can, however, also be effected by simultaneously setting the throttle device and the rotational speed of the stirrer.

The invention is illustrated in more detail with the aid of FIG. 1:

FIG. 1 shows diagrammatically a preferred stirrer mixer 10 for the mixing according to the invention of a polyurethane reaction mixture. The stirrer mixer 10 consists of a cylindrical mixing chamber 1 and a stirrer 2 rotating therein with an adjustable rotational speed, the stirrer being driven by a motor (not shown). The stirrer 2 contains a stirrer shaft 7 and blades or scoops 8 arranged thereon, wherein the blades or scoops 8 are mounted on the stirrer shaft 7 in six levels arranged above one another. Four blades or scoops 8 per level are arranged on the stirrer shaft 7. In each case one blade or scoop per level is located on the rear side of the stirrer shaft 7 and accordingly cannot be seen in the representation according to FIG. 1. The blades or scoops 8 are rotated by an angle α of 40° counter to the axis of rotation of the stirrer shaft 7. In the circumferential region of the mixing chamber 1, additionally flow-destroying elements 5 are mounted in the space between the levels of the blades or scoops 8. The stirrer mixer also has feed openings (3a, 3b, and 3c) for the components A (isocyanate), B (polyol) and C (additive) as well as an outlet opening 4 for the polyurethane reaction mixture and a throttle 6 connected downstream.

The components A, B and C are fed in a metered manner through the feed openings (3a, 3b, and 3c) into the mixing chamber 1 of the stirrer mixer 10, are mixed therein by the stirrer 2, and leave the mixing chamber 1 through the outlet opening 4 as polyurethane reaction mixture. The polyurethane reaction mixture passes through the adjustable throttle 6.

Due to the inclined adjustment of the blades 8, the pressure in the mixing chamber 1 can easily be lowered by raising the rotational speed. A reduction of the rotational speed correspondingly leads to a rise of the pressure in the mixing chamber 1. The pressure in the mixing chamber 1 may, however, also be achieved by more vigorous throttling of the throttle 6. In this way, the mixing chamber pressure and the quality of the mixing can be varied independently of one another by a matched adjustment of the rotational speed of the stirrer 2 and of the opening of the throttle 6.

Although the invention has been described in detail in the foregoing for the purpose of illustration, it is to be understood that such detail is solely for that purpose and that variations can be made therein by those skilled in the art without departing from the spirit and scope of the invention except as it may be limited by the appended claims.

What is claimed is:

1. In a method for the production of a polyurethane foam material, the improvement comprising controlling cell size in the foam made by continuous mixing of at least one polyol component and at least one isocyanate component and optionally additives to form a polyurethane reaction mixture in a stirrer mixer which comprises a cylindrical mixing chamber having a stirrer rotating therein with adjustable rotational speed, the stirrer containing a stirrer shaft and scoops or blades arranged thereon in one or more levels, the stirrer mixer having feed openings for at least the polyol component, the isocyanate component and optionally the additives and an outlet opening for the polyurethane reaction mixture, wherein three to six scoops or blades are arranged in each level on the stirrer shaft such that the scoops or blades are rotated by an angle $\alpha$ of 10° to 80° counter to the axis of rotation of the stirrer shaft, said method comprising:

pumping the polyol component, the isocyanate component and optionally the additives in a metered manner through the feed openings into the cylindrical mixing chamber and mixing therein to form the polyurethane reaction mixture; discharging the polyurethane reaction mixture from the mixing chamber through the outlet opening; and reducing the polyurethane reaction mixture pressure In an adjustable throttle, wherein the cell size is controlled by adjusting pressure in the mixing chamber by a mutually matched setting of the rotational speed of the stirrer and of the throttling effect of the throttle.

2. The method according to claim 1, wherein the exact adjustment of the pressure in the mixing chamber is made by changing the rotational speed of the stirrer at constant adjustment of the throttle device.

3. The method according to claim 1, wherein the exact adjustment of the pressure in the mixing chamber is made by adjusting the throttle device at constant rotational speed of the stirrer.

4. The method according to claim 1, wherein the scoops or blades are rotated by an angle $\alpha$ of 20° to 70° counter to the axis of rotation of the stirrer shaft.

5. The method according to claim 1, wherein the scoops or blades are rotated by an angle $\alpha$ of 30° to 60° counter to the axis of rotation of the stirrer shaft.

6. The method according to claim 1, wherein the scoops or blades are rotated by an angle $\alpha$ of 40° counter to the axis of rotation of the stirrer shaft.

7. The method according to claim 1, wherein the at least one isocyanate component is selected 1mm the group consisting of toluene diisocyanate (TDI) and isocyanates at the diphenylmethane series (MDI).

8. The method according to claim 1, wherein the at least one polyol component is selected from the group consisting of polyethers, polyesters and polyamines.

9. The method according to claim 1, wherein the additives are selected from the group consisting of blowing agents, catalysts, emulsifiers, stabilizers, reaction inhibitors, pigments, dyes, flameproofing agents and fillers.

10. The method according to claim 1, wherein the throttle or throttle device is selected from the group consisting of pinch valves and membrane valves.

11. The method according to claim 1, wherein the stirrer mixer further includes flow destroying elements affixed to the inner surface of the cylindrical mixing chamber such that the blades or scoops pass between the flow destroying elements during mixing.

12. The method according to claim 1, wherein the residence time of the reaction mixture inside the mixing chamber is between 0.1 and 2.5 seconds.

* * * * *